R. E. BRAND.
Mechanical-Movements.

No. 156,723.  Patented Nov. 10, 1874.

WITNESSES:  INVENTOR:
Chas. Nida  R. E. Brand
Alex F. Roberts  BY
 ATTORNEYS.

UNITED STATES PATENT OFFICE.

ROBERT E. BRAND, OF PLAINFIELD, NEW JERSEY.

IMPROVEMENT IN MECHANICAL MOVEMENTS.

Specification forming part of Letters Patent No. 156,723, dated November 10, 1874; application filed October 3, 1874.

*To all whom it may concern:*

Figure 1:
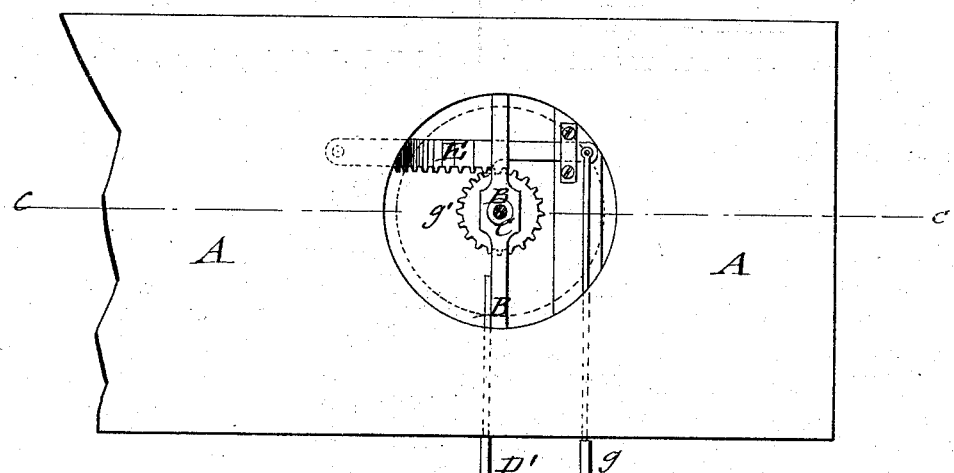
Figure 2:
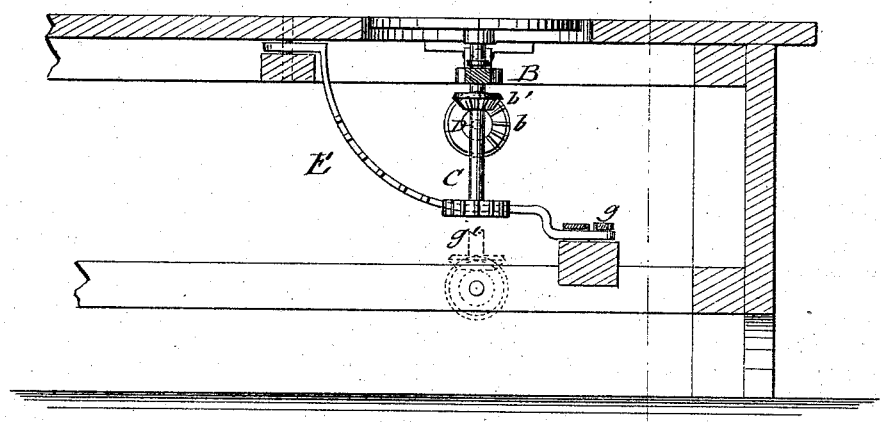
Figure 3:
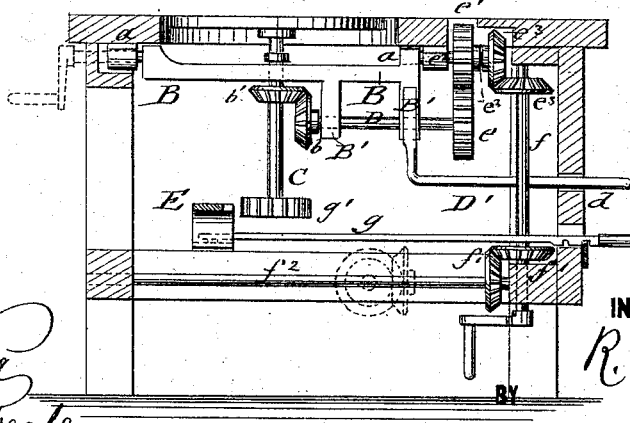

Be it known that I, ROBERT E. BRAND, of Plainfield, in the county of Union and State of New Jersey, have invented a new and Improved Mechanical Movement, of which the following is a specification:

In the accompanying drawing, Figure 1 represents a top view, Fig. 2 a vertical longitudinal section on the line $c\ c$, Fig. 1, and Fig. 3 a vertical transverse section on line $x\ x$, Fig. 2, of my improved mechanical movement.

Similar letters of reference indicate corresponding parts.

The object of my invention is to provide a mechanical movement by which rotary motion may be readily transmitted from the driving-shaft of a machine to an upright shaft placed in position under any angle of the quadrant, for the purpose of being used in hat-ironing, polishing, and similar machines, in which objects have to be worked upon under rapid rotation, and in any desired position.

My invention consists of an upright shaft, to which the object to be operated upon is applied by suitable attachments, and which rotates in a pivoted supporting-bar, that is thrown, either directly by a hand-crank, or, preferably, by a toothed quadrantal bracket meshing with a gear-wheel of the object-rotating shaft, into position with the same under any required angle of the quadrant, and retained therein by suitable fastening devices, while rotary motion is imparted to the object-shaft from the driving-shaft by vertical and horizontal shafts and intermeshing gear-wheels, in connection with an intermediate shaft and wheels of the pivoted bar.

In the drawing, A represents the frame or other support of the machine, to which my improved mechanical movement is to be applied. B is a pivoted bar, of suitable strength, that swings in bearings $a$ of frame A, and supports the upright object-carrying rotating shaft C, and in downward-extending arms B' the horizontal shaft D, that intermeshes by a bevel-wheel, $b$, with a similar wheel, $b'$, of the driving-shaft, into whatever position the pivoted frame may be swung. A rectangularly-bent rod or arm, D', is attached to swinging bar B, and extended through a quadrantal slot, $d$, to the outside of frame A, for the purpose of being attached thereto by the use of any suitable appliances, so that frame B, together with object-rotating shaft, may be rigidly retained in the position into which they are thrown. The intermediate horizontal shaft D is provided at its other end with a common gear-wheel, $e$, which intermeshes with a gear-wheel, $e^1$, of a shorter shaft, $e^2$, that is rotated by means of bevel-gearing $e^3\ e^3$ from a vertical shaft, $f$. Shaft $f$ gears by conical wheels $f^1$ with a horizontal shaft, $f^2$, rotated in connection with the main shaft, when the same is thrown by suitable clutch mechanism in and out of gear with the driving-shaft.

The common gear-wheels $e$ and $e^3$ of the swinging-shaft D, and the shorter intermediate shaft $e^2$, produce the transmission of motion from the horizontal and vertical shafts to the object-supporting shaft, in whatever position the latter may be set for the purposes of working upon the article or object thereon.

The position of shaft C, under any suitable angle of the quadrant, may be obtained directly by a hand-crank of the swinging supporting-bar B, or in a more preferable and accurate manner by means of a toothed quadrantal bracket, E, which is pivoted at its upper end to frame A, and set by a pivoted guide-rod, $g$, from the front part of frame A, so as to gear with a pinion, $g'$, at the lower end of object-rotating shaft C.

A hand-crank, applied to any one of the motion-transmitting shafts, produces by the action of the movement the swinging of shaft C along the bracket until the exact position required for the object is obtained. The shaft is securely fastened in this position by the retaining appliances, and the driving-shaft thrown into gear with the intermediate shafts, causing thus the rotation of the object and its supporting-shaft under any suitable angle required for the purpose of convenient manipulation.

Having thus described my invention, I claim as new and desire to secure by Letters Patent—

1. The mechanical movement for transmitting rotary motion to an upright shaft in any position within a quadrant, composed of pivoted supporting-bar B, with upright shaft C and horizontal intermediate shaft D, shorter transmitting-shaft $e^2$, and vertical and horizontal shafts $f\,f^2$, all provided with intermeshing gear-wheels, and combined with arm D' of frame D, and suitable fastening appliances, substantially in the manner and for the purpose set forth.

2. The combination of upright shaft C, having lower gear-wheel $g'$, with the adjustable toothed quadrantal bracket E, for throwing shaft into inclined position for rotation, substantially as specified.

ROBT. E. BRAND. [L. S.]

Witnesses:
JOHN H. JACKSON,
HENRY STRIKER.